United States Patent [19]

Weiner et al.

[11] 4,125,662
[45] Nov. 14, 1978

[54] PACKAGING FILM WITH IMPROVED HEAT SEALABILITY

[75] Inventors: Milton L. Weiner, Rochester; Peter Breidt, Jr., Webster; Thomas W. Higgins, Penfield, all of N.Y.

[73] Assignee: Mobil Oil Corporation, New York, N.Y.

[21] Appl. No.: 839,054

[22] Filed: Oct. 3, 1977

[51] Int. Cl.² .............................. B32B 27/32
[52] U.S. Cl. .................... 428/213; 428/214; 428/349; 428/355; 428/516; 428/523
[58] Field of Search .......... 428/213, 214, 349, 347, 428/355, 359, 515, 516, 523

[56] References Cited

U.S. PATENT DOCUMENTS

| T 941,020 | 12/1975 | Young | 428/349 |
| T 955,009 | 2/1977 | Lansbury et al. | 428/515 |
| 3,088,844 | 5/1963 | Hungerford | 428/349 X |
| 3,201,498 | 8/1965 | Brunson et al. | 428/349 X |
| 3,285,766 | 11/1966 | Barkis et al. | 428/349 |
| 3,891,008 | 6/1975 | D'Entremont | 428/516 X |

Primary Examiner—Harold Ansher
Attorney, Agent, or Firm—Charles A. Huggett; Ronald J. Cier

[57] ABSTRACT

A packaging film composition having an improved heat seal range. The film comprises a core, which is preferably propylene homopolymer or copolymer but which may be a blend of polypropylene with any other compatible polymer, such core being coated on one or both sides with butene-1 homopolymer or with a copolymer of butene-1 with ethylene.

4 Claims, 2 Drawing Figures

PACKAGING FILM WITH IMPROVED HEAT SEALABILITY

BACKGROUND OF THE INVENTION

1. Field of the Invention

The invention disclosed herein relates to thermoplastic film-forming resin compositions, and in particular it relates to a multi-layer, heat-sealable film suitable for conventional packaging applications.

2. Brief Description of the Prior Art

Oriented polypropylene film has become a useful and widely accepted packaging film because of its good moisture barrier, stiffness, high strength, and good optical properties. However, films of polypropylene do not exhibit good heat sealing properties, an important consideration in packaging applications. In order to get good heat sealability, it has been the practice to apply various types of coatings to the film. Coatings have conventionally been applied in separate coating operations, such as from emulsions, latices, extrusion coating and so forth, but such operations are costly and require additional handling of the film, and such additional handling can result in damage. Coextrusion has been used successfully to put a heat sealable coating on polypropylene and produces a film with good seat strength, but currently available coextrusion products have a very narrow heat seal range.

U.S. Pat. No. 3,972,964, issued to D. J. Doentremont, discloses a coating composition for heat-shrinkable thermoplastic film comprising blends of polybutene-1 with ethylene-propylene copolymer to provide abuse resistance with reduced tackiness without compromising the orientability of the base film. However, in order to achieve this objective, Doentremont specifies that the coating composition must have a polybutene-1 constitutent in the range of 5%–40% by weight and that it is undesirable to have more than 40% polybutene-1. Such a coating composition, while achieving the objectives of abuse resistance and reduced tackiness, does not impart good heat sealability to the film.

U.S. Defensive Publication No. T-955,009 (R. C. Lansbury and T. G. Heggs, Feb. 1, 1977) addresses the problem of heat sealability directly. Lansbury and Heggs have found that they can improve the sealability of polypropylene film by coextruding the polypropylene substrate with a coating composition comprising a blend of 10%–59% (by weight) ethylene-propylene copolymer with 41%–90% (by weight) of a homo- or copolymer of a $C_4$ to $C_{10}$ alpha-olefin to form a multi-layer film having a polypropylene core with a thin coating of such composition on one or both sides.

SUMMARY OF THE INVENTION

The present invention is a novel multi-layer film forming composition having an unexpectedly wide range of heat sealing temperatures. The film comprises a "core" or substrate of propylene homopolymer or, alternately, of a copolymer of propylene with a compatible polymer-forming olefin (e.g. ethylene, butene, etc.), or blends of propylene homo- and copolymers. This core is coated on one or both sides with a layer of butene-1 homopolymer, or with an ethylene copolymer of butene-1 wherein the ethylene content is between 0.25% and 10% by weight, the coating forming a "skin" which may comprise from 3% to 30% of the total thickness of the coated film.

The film may be made by any conventional technique in which a skin layer, which is substantially polybutene or an ethylene-butene copolymer, may be applied to a core or base layer consisting substantially of polypropylene. Any of the known methods of coextrusion or of extrusion coating can be used to make this film.

The film-forming composition, or any component thereof, can be used unaltered or can be modified with additives for improvement of slip, antiblock or static properties of the finished film. Also, suitable coloring components can be added to the coating compositions to provide a film in which the color on one side contrasts with the color on the opposing side, thereby providing added eye-appeal to the coated film.

BRIEF DESCRIPTION OF THE DRAWINGS

Our invention may be illustrated by reference to the following detailed description and drawings in which.

DESCRIPTION OF THE PREFERRED EMBODIMENT

The coated thermoplastic film of the present invention may be formed by any conventional technique for producing a multi-layered film, for example: coextrusion, lamination of previously extruded films; extrusion coating; emulsion coating; and so forth. The especially preferred method is coextrusion, but it is not our intention to limit the means of production to any single technique.

Figure 1:
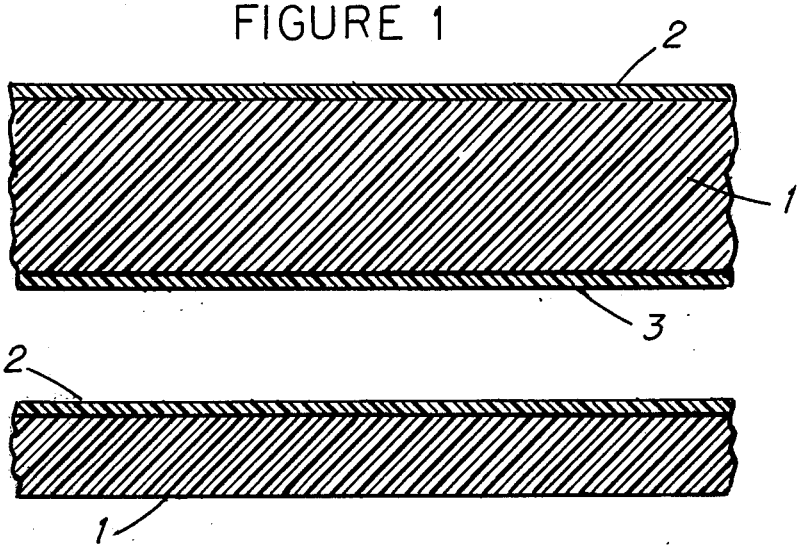
FIG. 1 is a schematic representation, in cross section, of a thermoplastic film having a coating on both surfaces thereof; and, FIG. 2 is a representation of a film having a coating on only one surface thereof.
Figure 2:
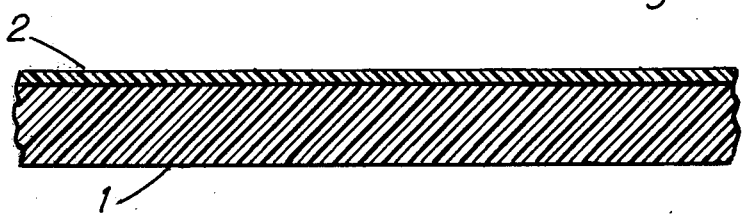

Films may be prepared having a coating on either one or both sides of the core film, as may be seen in the drawings. Films as shown in FIG. 1 were prepared by coextruding a core material of 4.5 MF (Melt Flow Rate) propylene homopolymer with a coating on both sides thereof (e.g., coatings 2 and 3 of FIG. 1) comprising butene-1 homopolymer. The molten polymers were coextruded from a conventional extruder through a flat sheet die, the melt streams being combined in an adaptor prior to being extruded from the die. Each skin layer 2 and 3 comprised approximately 7.5% of the total thickness of the film. The resin was extruded at about 204° C. (400° F.) for the core material and 218° C. (425° F.) for the skin material.

After leaving the die orifice, the coated films were quenched in a water bath at about 10° C. (50° F.). The quenched sheet was then reheated to about 93° C. (200° F.) and stretched 5× in the machine direction (MD) and subsequently about 7.5× in the transverse direction (TD). The high edges were trimmed off and the film wound on cores.

Using this same basic procedure, films were prepared having the following composition:

Film I—core:polypropylene; 0.77 mils
  coating:(both sides)—butene-1 homopolymer; 0.07 mils each side;
Film II—core:polyproplyene; 0.77 mils
  coating:(both sides)—butene-1/ethylene copolymer (5.1% ethylene); 0.07 mils each side;
Film III—core:polypropylene; 0.77 mils
  (Comparative) coating:(both sides)—ethylene/propylene copolymer (3.0% ethylene); 0.07 mils each side.

The various materials used for the aforesaid film structure (I, II and III) were as follows:

polypropylene: 4.5 Melt Flow Rate; density = 0.903 gm/cc.
  Butene-1 homopolymer: 1.8 Melt Index; Density = 0.915 gm/cc.
  Butene-1/ethylene copolymer (5.1% ethylene):2.0 Melt Index; density = 0.908 gm/cc.
  Ethylene/propylene copolymer (3.0% ethylene):4.5 Melt Index; density = 0.901 gm/cc.

The Table below shows the unexpectedly broad temperature range over which the present invention (as represented by Films I and II) affords a good heat seal of the polypropylene film as compared to the comparative formulation (Film III). The heat seal test method used was the E.S.M. Heat Seal Profile Test Procedure as outlined below.

E.S.M. Heat Seal Profile Test Procedure

Two 3 inch × 20 inch samples of film material are placed in an E.S.M. MANDREL HEAT SEAL UNIT with the desired sides of the film to be sealed facing each other. The mandrel is closed on the sample, automatically subjecting it to a series of preselected temperatures, each in a separate zone, at a predetermined pressure and for a predetermind time. The film sample is removed from the mandrel and, using a suitable template, a specimen measuring 1 inch × 20 inch, with the sealed areas at the different temperatures throughout the 20 inch direction, is cut therefrom. This test specimen is then placed in the clamps of a SUTER TESTER and, beginning at the end of the specimen subjected to the lowest heat and working toward the end subjected to the highest heat, the layers are pulled apart at the preset rate of 12 inches per minute. When the peak force required to open each seal zone is reached that value is recorded, the force laver returned to zero, and the next temperature seal tested in the same manner.

TABLE

| FILM | | ESM Seals - Grams/Inch at 5 PSI, 2.0 sec. Dwell | | | | | | |
|---|---|---|---|---|---|---|---|---|
| | | 240° F | 250° F | 260° F | 270° F | 280° F | 290° F | 300° F |
| I | | | | | | | | |
| roll 1 | (a) I/I | 0 | 0 | 0 | 140 | 475 | 485 | |
| | (b) O/O | 0 | 0 | 35 | 300 | 450 | 545 | |
| roll 2 | (a) I/I | 0 | 0 | 0 | 35 | 435 | 530 | |
| | (b) O/O | 0 | 0 | 0 | 245 | 450 | 605 | |
| II | (a) I/I | 5 | 45 | 460 | 570 | 610 | 650 | |
| III | (a) O/O | 0 | 0 | 0 | 0 | 0 | 10 | 520 |
| | (b) I/I | 0 | 0 | 0 | 0 | 0 | 25 | 390 |

Notes:
(a) The film was corona treated on this side.
(b) The film was not corona treated on this side.
I/I = Inside of film sealed to Inside of film.
O/O = Outside of film sealed to Outside of film.

As can be seen from this data, the films with the coating compositions of the present invention (i.e., Films I and II) form a useful heat seal at a substantially lower temperature than the prior art film (i.e., Film III). Film I formed a useful seal at temperatures as low as about 270° F. and Film II at temperatures between 250° and 260° F., while Film III required a substantially higher temperature (approaching 300° F.) for initial formation of a useful seal. It can also be seen that the seals of Films I and II are formed more gradually, thereby making possible the production, if desired, of a peelable seal by carefully controlling the sealing temperature. Such a peelable seal is difficult to obtain with Film III, which formed a permanent bond over a very narrow range at high temperature.

Resins useful for the outer "skin" layers of the present invention include homopolymers of butene-1 and copolymers of ethylene with butene-1 wherein the ethylene content is between 0.25% and 10% by weight. The core material may be any homopolymer of propylene, or a copolymer of propylene with ethylene or with butene-1, or it may comprise a blend of propylene homopolymer or copolymer with any compatible polymeric substance. For most applications, it is preferred that the core layer be substantially polypropylene.

The skin layer of the laminate structure embodied herein is usually 0.03 mil to 0.30 mil. for every mil of total film thickness. Generally preferred is a skin of 0.03 mil. to 0.10 mil. and a total film thickness of 0.5 mil to 1.25 mils.

Having thus described our invention, we claim:
1. A multiple-layer, heat-sealable film comprising:
  (a) a substrate layer which is substantially a homopolymer or copolymer of propylene, said substrate having a first and a second surface; and
  (b) on at least one of said surfaces, a layer formed from a member of the group consisting of butene-1 homopolymer and a copolymer of butene-1 with ethylene in which the ethylene content is 0.25% to 10% by weight.
2. The multiple-layer, heat-sealable film of claim 1 wherein the substrate is coated on at least one of said surfaces with butene-1 homopolymer.
3. The multiple-layer, heat-sealable film of claim 1 wherein the substrate is coated on at least one of said surfaces with a copolymer of butene-1 and ethylene, said copolymer having an ethylene content of 0.25% to 10% by weight.
4. The multiple-layer, heat-sealable film of claim 1 wherein the substrate comprises 70% to 97% of the total film thickness.

* * * * *

UNITED STATES PATENT AND TRADEMARK OFFICE
CERTIFICATE OF CORRECTION

PATENT NO. : 4,125,662

DATED : November 14, 1978

INVENTOR(S) : Milton L. Weiner, Peter Breidt, Jr. and Thomas W. Higgins

It is certified that error appears in the above-identified patent and that said Letters Patent are hereby corrected as shown below:

Column 3 - TABLE    Line beginning with "II (a)I/I" should read as follows:-

| 240°F | 250°F | 260°F | 270°F | 280°F | 290°F | 300°F |
|-------|-------|-------|-------|-------|-------|-------|
| 5     | 45    | 460   | 570   | 610   | 650   |       |

Signed and Sealed this

Twenty-ninth Day of May 1979

[SEAL]

Attest:

RUTH C. MASON  
Attesting Officer

DONALD W. BANNER  
Commissioner of Patents and Trademarks